(12) United States Patent
McColloch

(10) Patent No.: US 7,537,476 B1
(45) Date of Patent: May 26, 2009

(54) OPTICAL TRANSCEIVER MODULE HAVING A LATCHING BAIL MECHANISM THAT INCLUDES A BOSS POCKET THAT MATES WITH A BOSS FORMED ON THE OPTICAL TRANSCEIVER MODULE

(75) Inventor: Laurence R. McColloch, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/025,016

(22) Filed: Feb. 2, 2008

(51) Int. Cl.
*H01R 13/64* (2006.01)
(52) U.S. Cl. ...................... 439/372; 439/157
(58) Field of Classification Search ............. 439/372, 439/370, 350, 352, 157, 49
See application file for complete search history.

(56) References Cited

U.S. PATENT DOCUMENTS 6,824,416 B2 * 11/2004 Di Mascio .................. 439/352

* cited by examiner

*Primary Examiner*—Javaid Nasri

(57) ABSTRACT

An optical transceiver module is provided that has an eccentric latching bail mechanism that includes a latch having a boss pocket formed therein that mates with a boss formed on the transceiver module housing when the latching mechanism is in the locked position. The mating of the boss and boss pocket in the locked position of the latching mechanism provide the latching mechanism with a high degree of stiffness that ensures that forces that are exerted on the latch lock pin by elements other than the latching bail mechanism are transferred to the transceiver module housing rather than through the bail. This, in turn, obviates problems associated with existing spring loading latching mechanisms that are less stiff and that allow forces exerted on the latch lock pin to be transferred through the bail.

16 Claims, 7 Drawing Sheets

OPTICAL TRANSCEIVER MODULE HAVING A LATCHING BAIL MECHANISM THAT INCLUDES A BOSS POCKET THAT MATES WITH A BOSS FORMED ON THE OPTICAL TRANSCEIVER MODULE

TECHNICAL FIELD OF THE INVENTION

The invention relates to optical transceiver modules. More particularly, the invention relates to a latching bail mechanism of a transceiver module that includes a boss pocket that mates with a boss formed on the transceiver module when the latching bail mechanism is in the locked position.

BACKGROUND OF THE INVENTION

In optical communications networks, optical transceiver modules are used to transmit and receive optical signals over optical fibers. On the transmit side of a transceiver module, a light source (e.g., a laser diode) generates amplitude modulated optical signals that represent data, which are received by an optics system of the transceiver module and focused by the optics system into an end of a transmit optical fiber. The signals are then transmitted over the transmit fiber to a receiver node of the network. On the receive side of the transceiver module, the optics system of the transceiver module receives optical signals output from an end of a receive optical fiber and focuses the optical signals onto an optical detector (e.g., a photodiode), which converts the optical energy into electrical energy.

The transmit and receive fiber cables have connectors on their ends, often LC connectors, that are adapted to mate with transmit and receive receptacles, respectively, formed in the transceiver module. A variety of optical transceiver module configurations are used in optical communications network. Some optical transceiver modules have multiple transmit receptacles and multiple receive receptacles for connecting multiple receive and transmit fiber cables to the module. Some transceiver modules having a single receive receptacle and a single transmit receptacle arranged side by side for connecting a single receive fiber cable and a single transmit fiber cable, respectively, to the transceiver module.

The transceiver modules themselves also have mating elements on them that are adapted to mate with mating elements formed on the cages. The cages are contained in racks, and each rack typically includes many cages that are arranged in very close proximity to one another. Each of these cages is configured to receive a transceiver module on the front side of the rack through a front panel of the rack. The transceiver modules are configured so that they may be inserted into and removed from the cages. The modules typically include latching mechanisms that couple to mating features on the cages when the modules are inserted into the cages. In order to remove a module from a cage, the module must be de-latched to decouple the latching mechanism from the features on the cage, which can be challenging when the modules are spaced closely together in the racks.

A variety of different latching mechanism configurations are used on optical transceiver modules. In general, latching mechanisms used on optical transceiver modules include spring loading elements that maintain the latching mechanisms in their locked positions via spring forces. These types of latching mechanisms typically include a bail that is moved to a locked position in order to latch the module to the cage and that is moved to an unlocked position in order to de-latch the module from the cage. When the bail is in the locked position, a latch lock pin extends through an opening formed in the cage to prevent movement of the module relative to the cage and relative to the LC connectors connected to the transmit and receive receptacles. When the bail is in the locked position, the latch lock pin is retracted from the opening formed in the cage, making it possible to remove the module from and insert the module into the cage.

The latching mechanism needs to provide sufficient "stiffness", or rigidity, when in the locked position. When forces are exerted on the optical fiber cables, those forces are transferred from the cable to the LC connector attached to the end of the cable. The forces transferred to the LC connector are then transferred from the connector to the transceiver module housing, and then from the transceiver module housing to the latch lock pin and cage. If the latching mechanism is not sufficiently stiff when the bail is in the locked position, the forces that are transferred from the latch lock pin to the bail can result in unwanted movement of the transceiver relative to the cage and PCB connector, possibly resulting in de-latching, or unlocking, of the latching mechanism.

Accordingly, a need exists for an optical transceiver module having a latching bail mechanism that is sufficiently stiff and strong. This often means that the flow of forces cannot be allowed to flow through the bail, which is often relatively flimsy in structure.

SUMMARY OF THE INVENTION

The invention provides an optical transceiver module and method. The optical transceiver module comprises an optical transceiver module housing and a latching bail mechanism. The housing has at least a first receptacle and a second receptacle formed therein for receiving a first optical fiber connector and a second optical fiber connector, respectively. The module housing has at least an upper surface and a lower surface. The latching bail mechanism is mechanically coupled to the transceiver module housing. The latching bail mechanism has at least a bail, a latch base and a lock pin. The bail is configured to be positioned in a locked position and in an unlocked position. The latch lock pin is configured to be placed in an extended position and in a retracted position. When the bail is placed in the locked position, this causes the lock pin to be placed in the extended position. When the bail is placed in the unlocked position, this causes the lock pin to be placed in the retracted position. The latch base has an upper surface and a lower surface. The latch lock pin is disposed on the lower surface of a distal end of the latch base. One of the upper surface of the latch base and the lower surface of the module housing has a boss formed thereon, and the other of the upper surface of the latch base and the lower surface of the module housing has a boss pocket formed therein. The boss pocket has a shape that is generally complimentary of a shape of the boss such that when the latching bail mechanism is in the locked position, the boss is in a mating relationship with the boss pocket. If forces are exerted on the latch lock pin by elements other than the latching bail mechanism when the latch lock pin is in the fully extended position, those forces are transferred through the mated boss and boss pocket to the module housing. Thus, forces exerted on the latch lock pin by elements other than the latching bail mechanism are prevented from being transferred through the bail.

The method comprises providing an optical transceiver module housing having at least a first receptacle and a second receptacle formed therein for receiving a first optical fiber connector and a second optical fiber connector, respectively, mechanically coupling a latching bail mechanism to the transceiver module housing having at least a bail, a latch base and a lock pin. The bail is configured to be positioned in a locked position and in an unlocked position. The lock pin is configured to be placed in an extended position and in a retracted position. Placing the bail in the locked position causes the lock pin to be placed in the extended position. Placing the bail in the unlocked position causes the lock pin to be placed in the retracted position. The latch base has an upper surface and a lower surface, and the lock pin is disposed on the lower surface of a distal end of the latch base. One of the upper surface of the latch base and the lower surface of the module housing has a boss formed thereon, and the other one of the upper surface of the latch base and the lower surface of the module housing has a boss pocket formed therein. The boss pocket has a shape that is generally complimentary of the shape of the boss such that when the latching bail mechanism is in the locked position, the boss is in a mating relationship with the boss pocket. If forces are exerted on the latch lock pin by elements other than the latching bail mechanism when the latch lock pin is in the fully extended position, those forces are transferred through the mated boss and boss pocket to the module housing.

These and other features and advantages of the invention will become apparent from the following description, drawings and claims.

DETAILED DESCRIPTION OF AN ILLUSTRATIVE EMBODIMENT

In accordance with various embodiments that will be described herein, an optical transceiver module is provided that has an eccentric latching bail mechanism that includes a latch having a boss pocket formed therein that mates with a boss formed on the transceiver module housing when the latching mechanism is in the locked position. The mating of the boss and boss pocket in the locked position of the latching mechanism provide the latching mechanism with a high degree of stiffness that ensures that forces exerted on the latch locking pin are transferred to the transceiver module housing rather than through the bail. This, in turn, obviates the aforementioned problems associated with existing spring loading latching mechanisms and relatively flimsy, i.e., non-stiff, bails.

Figure 1:
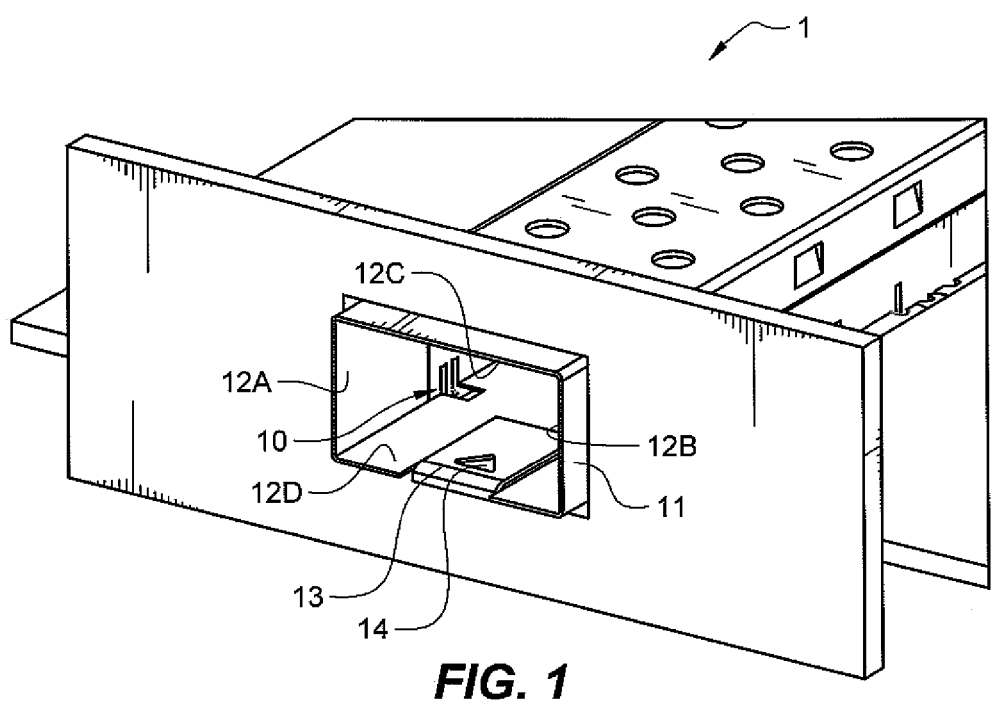
FIG. 1 illustrates a perspective view of a portion of the front side of a rack having a cage secured thereto that is suitable for receiving the transceiver module of the invention.

FIG. 1 illustrates a perspective view of a portion of the front side of a rack 1 having a known cage 10 secured thereto. The cage 10 is typically made of a flexible material, such as sheet metal for example, although other materials, such as die cast zinc may be used for the cage 10. Typically, the rack 1 will contain many such cages mounted one atop the other and side by side in close proximity to one another. The cage 10 has an interior compartment for receiving the transceiver module (not shown) through a front face 11 of the cage 10. The transceiver module is described below in detail. The interior compartment of the cage 10 is defined by first and second side walls 12A and 12B, respectively, and top and bottom walls 12C and 12D, respectively. The cage 10 has a leaf spring finger 13 formed on the bottom wall 12D, which is typically made of sheet metal, and a catch 14 formed in the finger 13. The catch 14 is an opening shaped to receive a latch lock pin (FIG. 2B, item 40A) of the latching bail mechanism, as will be described below with reference to FIG. 2B.

Figure 2A:
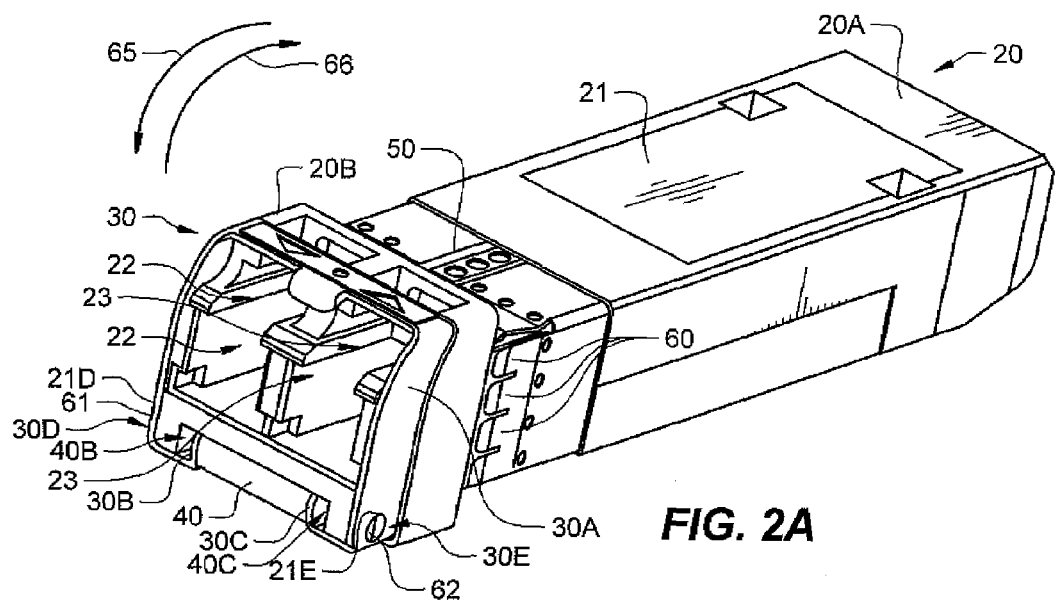
FIG. 2A illustrates a perspective top view of a portion of the transceiver module of the invention in accordance with an illustrative embodiment, which shows the latching bail mechanism of the transceiver module in the locked position.

FIG. 2A illustrates a perspective top view of a portion of the transceiver module 20 of the invention in accordance with an illustrative embodiment, which shows the latching bail mechanism 30 of the transceiver module 20 in the locked position. In the locked position, the bail 30A of the latching bail mechanism 30 is in the upright position shown. The latching bail mechanism 30 is typically made of sheet metal, although other materials, such as molded plastic, for example, may be used for this purpose. Likewise, the transceiver module housing 21 is typically made of sheet metal, although other materials, such as molded plastic, for example, may be used to make the transceiver module 20. The transceiver module 20 also includes an electromagnetic interference (EMI) collar 50 that is made of conductive material and that has periodically spaced conductive elements 60 thereon for absorbing electromagnetic radiation emanating from within the module 20, including at the opening in the cage 10 that defines the catch 14 (FIG. 1).

The transceiver module housing 21 has a proximal end portion 20A and a distal end portion 20B. When the transceiver module housing 21 is inserted into the cage 10 (FIG. 1), the proximal end portion 20A enters the cage 10 first. The transmit and receive receptacles 22 and 23, respectively, remain exposed through the front face 11 of the cage 10 to enable connectors (not shown) disposed on the ends of optical fibers (not shown) to be connected to the receptacles 22 and 23 of the module 20. The connectors are often LC connectors, although other types of connectors may be used. The latching bail mechanism 30 includes a latch base 40 having male rotational coupling devices 40B and 40C that are received in and mate with female rotational coupling mechanisms 30B and 30C formed in the interior surfaces of the bail 30A. The male rotational coupling mechanism 40B and 40C formed in the latch base 40 are cylindrically shaped pins formed on proximal and distal ends of an axis about which the bail 30A rotates as it is moved from the locked position to the unlocked position, and vice versa.

The bail 30A has circular openings 30D and 30E formed in the outer surfaces thereof that receive tapered pins 21D and 21E, respectively, formed on the module housing 21. The latching bail mechanism 30 is secured to the module housing 21 by inserting the pins 21D and 21E into the circular openings 30D and 30E and then inserting the dowels 61 and 62 into the openings 30D and 30E, respectively. The bail 30A is then free to move in an arcuate manner in the downward and upward directions represented by arrows 65 and 66, respectively, through the rotational movement of the openings 30D and 30E about the pin/dowel pairs 61/21D and 62/21E, respectively.

Figure 2B:
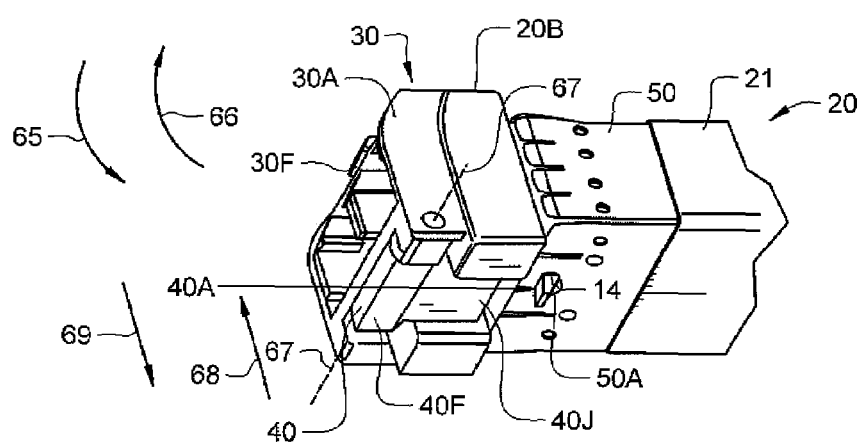
FIG. 2B illustrates a perspective bottom view of a portion of the transceiver module shown in FIG. 2A, which shows the latching bail mechanism in the locked position depicted in FIG. 2A.

FIG. 2B illustrates a perspective bottom view of a portion of the transceiver module 20 shown in FIG. 2A, which shows the latching bail mechanism 30 in the locked position depicted in FIG. 2A. In the locked position, the latch lock pin 40A is fully extended down through the opening forming the catch 14 in the cage 10 (FIG. 1) and through an opening 50A formed in the EMI collar 50. When the bail 30A is moved toward the locked position shown in FIGS. 2A and 2B, the female rotational coupling mechanisms 30B and 30C move along an axis that is eccentric relative to an imaginary axis 67 that passes through the centers of the circular openings 30D and 30E formed in the outer surfaces of the bail 30A. The movement is in the direction indicated by arrow 66 and the eccentric access is parallel to axis 67. This eccentric movement of the female rotational coupling mechanisms 30B and 30C causes the pins 40B and 40C that are disposed on the latch base 40 and coupled with the female rotational coupling mechanisms 30B and 30C, respectively, to also move eccentrically relative to the imaginary axis 67 in the direction of arrow 66. This, in turn, causes the proximal end 40F of the latch base 40 to be moved in the upward direction represented by arrow 68.

For reasons that will be described in detail below with reference to FIGS. 4-6B, when the proximal end 40F of the latch base 40 is moved in the upward direction indicated by arrow 68, this movement causes the latch lock pin 40A to be forced down through the openings 14 and 50A. Thus, when the proximal end 40F of the latch base 40 cannot be moved any farther in the direction indicated by arrow 68, the latch lock pin 40A is in its fully extended position. In this position, any forces exerted on the module housing 21 that are transferred to the latch lock pin 40A are then transferred to the housing 21, where they are absorbed, as will be described below in detail with reference to FIGS. 4-6B.

When the bail 30A is moved to the unlocked position by moving the bail 30A in the downward direction represented by arrow 65, the female rotational coupling mechanisms 30B and 30C move along an axis that is eccentric relative to the imaginary axis 67 that passes through the centers of the circular openings 30D and 30E formed in the exterior surfaces of the bail 30A. This eccentric movement of the female rotational coupling mechanisms 30B and 30C is in the direction indicated by arrow 65. This eccentric movement causes the pins 40B and 40C that are disposed on the latch base 40 and coupled with the female rotational coupling mechanisms 30B and 30C, respectively, to also move along the access that is eccentric relative to the imaginary axis 67 in the direction of arrow 65. This, in turn causes the proximal end 40F of the latch base 40 to be moved in the downward direction represented by arrow 69.

For reasons that will be described in detail below with reference to FIGS. 4-6B, when the proximal end 40F of the latch base 40 is moved in the downward direction indicated by arrow 69, this movement causes the latch lock pin 40A to retract through the openings 14 and 50A. Movement of the proximal end 40F of the latch base 40 in one direction produces movement of the distal end 40J of the latch base 40 in the opposite direction. Thus, the distal end 40J of the latch base 40 cannot be moved any farther due to abutment with the lower surface of the housing 21, the latch lock pin 40A is in its fully retracted position, as will be described below in detail with reference to FIGS. 4-6B.

Figure 3:
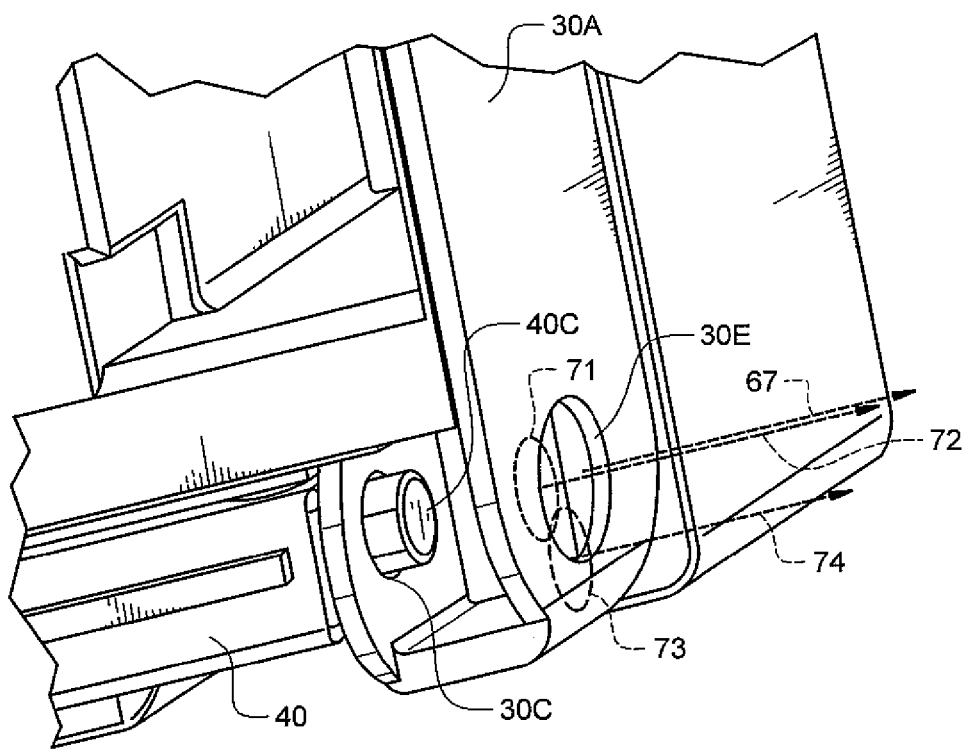
FIG. 3 illustrates a perspective view of a portion of the transceiver module shown in FIG. 2B that demonstrates the eccentric configuration of the latching bail mechanism.

FIG. 3 illustrates a perspective view of a portion of the transceiver module 20 shown in FIG. 2B that demonstrates the eccentric configuration of the latching bail mechanism 30. The circular opening 30E formed in the exterior portion of the bail 30A has an axis of rotation indicated by arrow 67. The pin 40C and the circular opening comprising the female rotational coupling mechanism 30C are coaxial and share an imaginary axis indicated by arrow 72. The circle 71 is a projection of the diameter of the pin 40C onto the outer portion of the bail 30A. The circular opening comprising the female rotational coupling mechanism 30C is generally the same as diameter 71, but is slightly larger to allow the opening 30C to rotate about the pin 40C. Thus, the circular opening comprising the female rotational coupling mechanism 30C is eccentric relative to the circular opening 30E formed in the exterior portion of the bail 30A.

When the bail 30A is in the locked position depicted in FIG. 3, the pin 40C of the latch base 40 is centered on axis 72. When the bail 30A is in the unlocked position, the pin 40C is centered on axis 74. The circle 73 is a projection of the diameter of the pin 40C onto the exterior portion of the bail 30A, which coincides with the bail 30A being in the unlocked position. Thus, when the bail 30A moves from the locked position to the unlocked position, and vice versa, the outer diameter of the pin 40C scribes a circle having a center axis that is parallel to the fixed center axis 67 of the exterior portion of the bail 30A, but offset by a selected amount from the center axis 67. The opposite side of the module 21 comprising the pin 40B, rotational coupling mechanism 30B formed in the interior portion of the bail 30A, and opening 30D formed in the exterior portion of the bail 30A (FIG. 2A), operates in the same manner.

This eccentric movement of the rotational coupling mechanisms 30B and 30C and of the pins 40B and 40C coupled with the rotational coupling mechanisms 30B and 30C, respectively, forces the proximal end 40F of the latch base 40 in the upward direction (arrow 68, FIG. 2B) when the bail 30A is moved to the locked position and forces the proximal end 40F in the downward direction (arrow 69, FIG. 2B) when the bail 30A is moved to the unlocked position. When the proximal end 40F of the latch base 40 is moved in the upward direction to the extent that the upper surface of the proximal end 40F abuts the lower surface of the module housing 21, the distal end 40J of the latch base 40 is forced downward such that the latch lock pin 40A is forced downward through the catch opening 14 and through the opening 50A formed in the EMI collar 50. When the proximal end 40F of the latch base 40 is moved in the downward direction, the distal end 40J of the latch base 40 is forced upward such that the latch lock pin 40A is forced upward and is thereby retracted through the catch opening 14 and through the opening 50A formed in the EMI collar 50.

Figure 4:
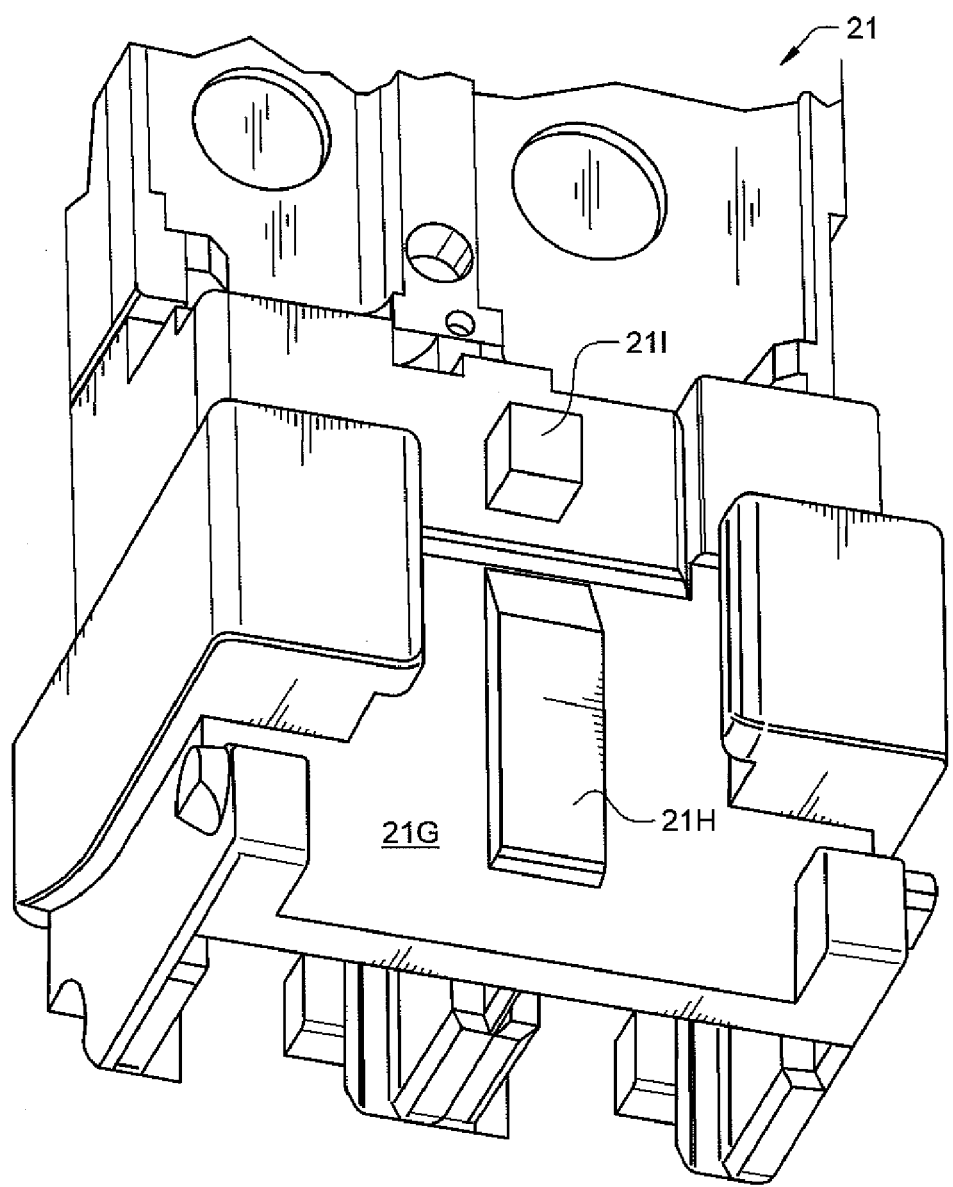
FIG. 4 illustrates a perspective view of the lower surface of the housing 21 shown in FIGS. 2A and 2B.
Figure 5:
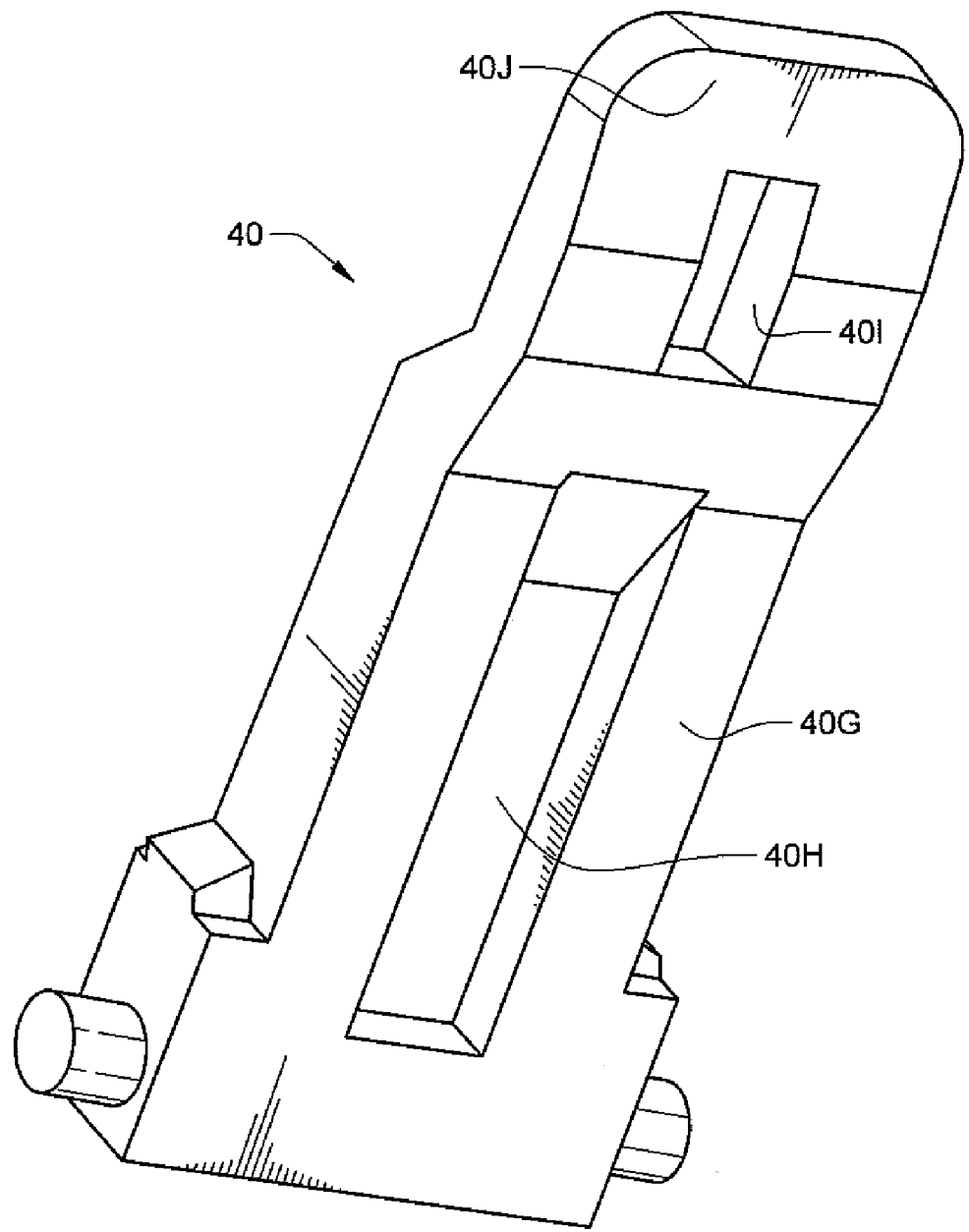
FIG. 5 illustrates a perspective view of the upper surface of the latch base of the transceiver module shown in FIGS. 2A and 2B.

FIG. 4 illustrates a perspective view of the lower surface 21G of the housing 21. FIG. 5 illustrates a perspective view of the upper surface 40G of the latch base 40. The manner in which the lower surface 21G of the housing 21 and the upper surface 40G of the latch base 40 interact during locking and unlocking of the latching bail mechanism 30 will now be described with reference to FIGS. 4 and 5. The lower surface 21G of the module housing 21 has a boss 21H formed thereon. The upper surface 40G of the latch base 40 has a boss pocket 40H formed therein that has shape that is complimentary to the shape of the boss 21H formed on the lower surface 21G of the housing 21. Thus, when the bail 30A (FIGS. 2A-3) is in the locked position, each surface of the boss 21H is in contact with a respective surface of the boss pocket 40H. The lower surface 21G of the housing 21 also has a key 21I formed thereon that is shaped to be received in a keyway opening 401 formed in the latch base 40. The mating of the key 21I within the keyway opening 401 prevents movement of the latch base 40 relative to the housing 21 in the lateral directions, i.e., in axial directions along the axis 67 (FIG. 2B) and in axial directions parallel to axis 67 but not necessarily along axis 67. At the same time, the mating of the key 21I and keyway opening 40I allow movement of the latch base 40 in the directions indicated by arrows 68 and 69 in FIG. 2B.

Figure 6A:
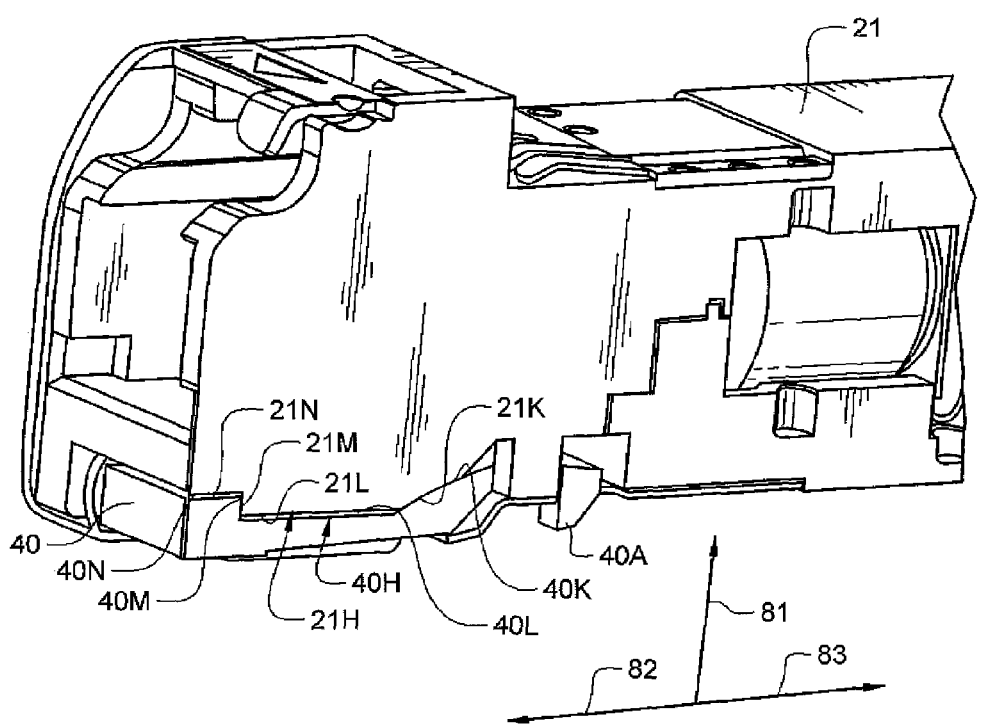
FIG. 6A illustrates a perspective view of a cross-section of the transceiver module shown in FIGS. 2A and 2B that depicts the transmit side of the module when the latching bail mechanism is in the locked position.

FIG. 6A illustrates a perspective view of a cross-section of the transceiver module 20 shown in FIGS. 2A and 2B that depicts the transmit side of the module 20 when the latching bail mechanism 30 is in the locked position. In the locked position, the boss 21H formed on the lower surface 21G of the module housing 21 is perfectly mated with the boss pocket 40H formed in the latch base 40. In this position, if a force is exerted on the lock pin 40A in the upward direction indicated by arrow 81, in the outward direction indicated by arrow 82, in the inward direction indicated by arrow 83, or in any upward or inward and outward direction between the directions indicated by arrows 81, 82 and 83, the resultant force will be transferred as follows: from the lock pin 40A to the boss pocket 40H formed in the latch base 40; from the boss pocket 40H to the boss 21H; and from the boss 21H to other portions of the housing 21 where the force will then be absorbed.

For example, a force exerted on the latch lock pin 40A in the outward direction indicated by arrow 82 will be transferred from surface 40K of the boss pocket 40H to surface 21K of the boss 21H. A force exerted on the latch lock pin 40A in the upward direction indicated by arrow 81 will be transferred from surfaces 40L and 40M of the boss pocket 40H to surfaces 21L and 21M, respectively, of the boss 21H. A force exerted in the inward direction indicated by arrow 83 will be transferred from surface 40M of the boss pocket 40H to the surface 21M of the boss. Any force exerted in an upward-and-outward direction will be transferred from surfaces 40K, 40L and 40N of the boss pocket 40H to surfaces 21K, 21L and 21N, respectively, of the boss 21H. Any force exerted in an upward-and-inward direction will be transferred from surfaces 40N, 40M, 40L and 40K of the boss pocket 40H to surfaces 21N, 21M, 21L and 21K, respectively, of the boss 21H. In all cases, the forces transferred from the boss pocket 40H to the boss 21H are then transferred from the boss 21H to other portions of the module housing 21, where they are absorbed. Consequently, no force exerted on the latch lock pin 40A is transferred to the bail 30A of the latching bail mechanism 30 (FIGS. 2A and 2B).

Figure 6B:
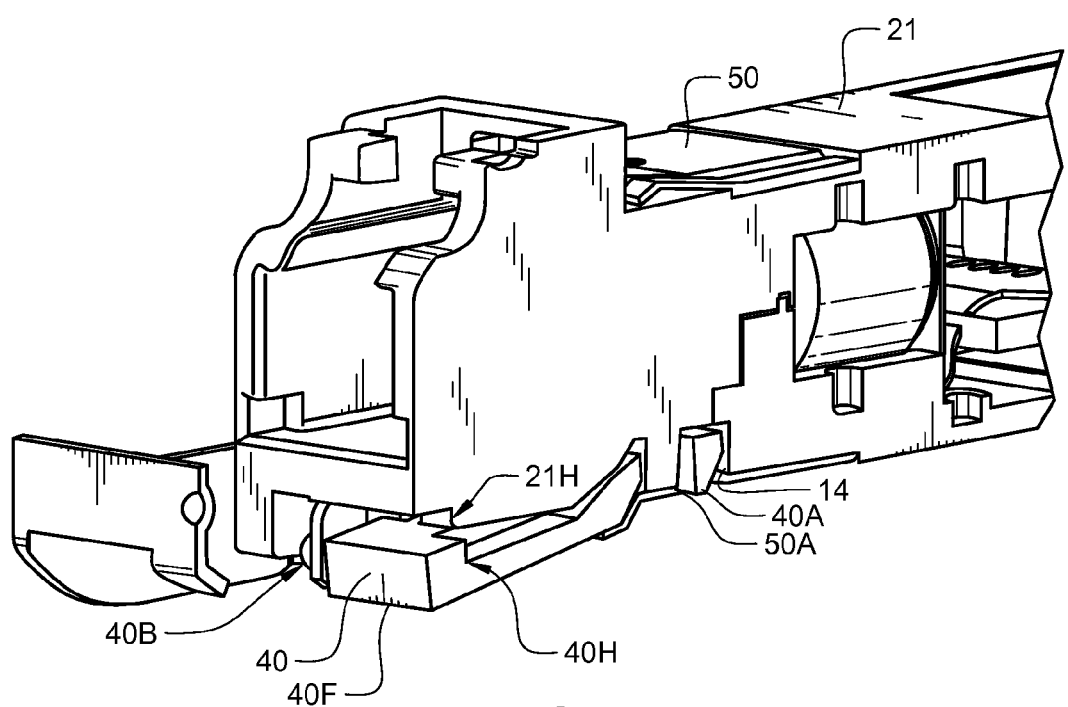
FIG. 6B illustrates a perspective view of a cross-section of the transceiver module shown in FIGS. 2A and 2B that depicts the transmit side of the module when the latching bail mechanism is in the unlocked position.

FIG. 6B illustrates a perspective view of a cross-section of the transceiver module 20 shown in FIGS. 2A and 2B that depicts the transmit side of the module 20 when the latching bail mechanism 30 is in the unlocked position. When the bail 30A (FIG. 2A) is moved in the downward direction (arrow 65, FIG. 2A), the boss 21H formed on the lower surface 21G of the module housing 21 and the boss pocket 40H formed in the latch base 40 are decoupled from each other, and the proximal end 40F of the latch base 40 is moved in downward direction (arrow 69 FIG. 2B). This movement causes the latch lock pin 40A to retract in the upward direction through the catch opening 14 and the opening 50A formed in the EMI collar 50 to its fully retracted position depicted in FIG. 6B.

Thus, it can be seen from the description provided above that when the latching bail mechanism 30 is placed in the locked position, the mating of the boss formed 21H on the housing 21 with the boss pocket 21H formed on the latch base 30 results in the transceiver module 20 having great stiffness and robustness when the latching bail mechanism 30 is in the locked position. This prevents forces that are exerted on the latch lock pin 40A from being transferred to the bail 30A, and instead causes those forces to be transferred to the module housing 21, where the forces are absorbed. Consequently, the problems associated with the known latching mechanisms that relay on spring loading forces to maintain the latching bail mechanisms in the locked positions are obviated.

It should be noted that the invention has been described with reference to a few illustrative embodiments for the purposes of demonstrating the principles and concepts of the invention and the manner in which they may be implemented. The invention is not limited to these embodiments, but rather, a variety of modifications may be made to these embodiments without deviating from the scope of the invention. Also, while certain materials have been described herein as being used to make the transceiver module and the latching bail mechanism, the invention is not limited to using these materials. For example, although the latching bail mechanism has been described as being made of sheet metal, molded plastic and other materials are suitable for this purpose. In addition, while the transceiver module has been described as an optical transceiver module, the module design having the boss and boss pocket configuration may be used for other types of applications for other industrial purposes. In addition, although FIGS. 6A and 6B depict a particular shape for the boss and boss pocket, a variety of the other shapes and surface designs can be used to achieve the goals of the invention, as will be understood by those skilled in the art in view of the description provided herein. Furthermore, which the description provided above describes the boss being formed on the module housing and the boss pocket being formed in the latch base, essentially the same effect could be provided if the boss is instead formed on the latch base and the boss pocket is instead formed on the module housing. Those skilled in the art will understand the manner in which these and other modifications may be made to the embodiments described herein and that all such modifications are within the scope of the invention.

What is claimed is:

1. An optical transceiver module comprising:
an optical transceiver module housing, the housing having at least a first receptacle and a second receptacle formed therein for receiving a first optical fiber connector and a second optical fiber connector, respectively, the module housing having at least an upper surface and a lower surface;
a latching bail mechanism mechanically coupled to the transceiver module housing, the latching bail mechanism having at least a bail, a latch base and a lock pin, the bail being configured to be positioned in a locked position and in an unlocked position, the lock pin being configured to be placed in an extended position and in a retracted position, wherein placing the bail in the locked position causes the lock pin to be placed in the extended position, and wherein placing the bail in the unlocked position causes the lock pin to be placed in the retracted position, the latch base having an upper surface and a lower surface, the lock pin being disposed on the lower surface of a distal end of the latch base; and
wherein one of the upper surface of the latch base and the lower surface of the module housing has a boss formed thereon, and wherein one of the upper surface of the latch base and the lower surface of the module housing has a boss pocket formed therein, the boss pocket having a shape that is generally complimentary of a shape of the boss such that when the latching bail mechanism is in the locked position, the boss is in a mating relationship with the boss pocket, and wherein forces exerted on the latch lock pin by elements other than the latching bail mechanism when the latch lock pin is in the fully extended position are transferred through the mated boss and boss pocket to the module housing.

2. The optical transceiver module of claim 1, wherein the latching bail mechanism has an eccentric configuration.

3. The optical transceiver module of claim 1, wherein the boss is formed on the lower surface of the module housing and the boss pocket is formed in the upper surface of the latch base.

4. The optical transceiver module of claim 1, wherein the boss pocket is formed in the lower surface of the module housing and the boss is formed in the upper surface of the latch base.

5. The optical transceiver module of claim 1, wherein the bail is coupled by first and second rotational coupling mechanisms of the bail to first and second rotation coupling mechanisms of the transceiver module housing, the first and second rotational coupling mechanisms of the bail and of the module housing providing the bail with freedom to rotate about a first axis in first and second directions through a range of angles, and wherein the bail is coupled by third and fourth rotational coupling mechanisms of the bail to first and second rotational coupling mechanisms of the latch base, the first and second rotational coupling mechanisms of the latch base being disposed on a proximal end of the latch base, the third and fourth rotational coupling mechanisms of the bail and the first and second rotational coupling mechanisms on the proximal end of the latch base providing the proximal end of the latch base with freedom to rotate about a second axis in third and fourth directions through a range of angles, wherein the second axis is eccentric to the first axis.

6. The optical transceiver module of claim 5, wherein rotation of the bail in the first direction moves the bail toward the locked position and wherein rotation of the bail in the second direction moves the bail toward the unlocked position, wherein rotation of the bail in the first direction causes the proximal end of the latch base to be rotated in the third direction, and wherein rotation of the proximal end of the latch base in the third direction causes the boss and boss pocket to be moved closer together.

7. The optical transceiver module of claim 6, wherein rotation of the bail in the second direction causes the proximal end of the latch base to be rotated in the fourth direction, and wherein rotation of the proximal end of the latch base in the fourth direction causes the boss and boss pocket to be moved farther away from each other.

8. The optical transceiver module of claim 1, wherein the latching bail mechanism further comprises a de-latching element having an end portion that extends below a top surface of the bail when the bail is in the locked position, the end portion of the de-latching element being disposed to allow a person or device to de-latch the latching bail mechanism by contacting a bottom surface of the end portion and pulling the end portion in a direction away from the transceiver module housing.

9. A method for preventing forces exerted on a latch lock pin of a latching bail mechanism of an optical transceiver module from being transferred to a bail of the latching bail mechanism, the method comprising:
providing an optical transceiver module housing having at least a first receptacle and a second receptacle formed therein for receiving a first optical fiber connector and a second optical fiber connector, respectively, the module housing having at least an upper surface and a lower surface;

mechanically coupling a latching bail mechanism to the transceiver module housing, the latching bail mechanism having at least a bail, a latch base and a lock pin, the bail being configured to be positioned in a locked position and in an unlocked position, the lock pin being configured to be placed in an extended position and in a retracted position, wherein placing the bail in the locked position causes the lock pin to be placed in the extended position, and wherein placing the bail in the unlocked position causes the lock pin to be placed in the retracted position, the latch base having an upper surface and a lower surface, the lock pin being disposed on the lower surface of a distal end of the latch base; and
wherein one of the upper surface of the latch base and the lower surface of the module housing has a boss formed thereon, and wherein one of the upper surface of the latch base and the lower surface of the module housing has a boss pocket formed therein, the boss pocket having a shape that is generally complimentary of a shape of the boss such that when the latching bail mechanism is in the locked position, the boss is in a mating relationship with the boss pocket, and wherein forces exerted on the latch lock pin by elements other than the latching bail mechanism when the latch lock pin is in the fully extended position are transferred through the mated boss and boss pocket to the module housing.

10. The method of claim 9, wherein the latching bail mechanism has an eccentric configuration.

11. The method of claim 9, wherein the boss is formed on the lower surface of the module housing and the boss pocket is formed in the upper surface of the latch base.

12. The method of claim 9, wherein the boss pocket is formed in the lower surface of the module housing and the boss is formed in the upper surface of the latch base.

13. The method of claim 9, wherein the latching bail mechanism is mechanically coupled to the module housing by coupling first and second rotational coupling mechanisms of the bail to first and second rotational coupling mechanisms of the transceiver module housing, the first and second rotational coupling mechanisms of the bail and of the module housing providing the bail with freedom to rotate about a first axis in first and second directions through a range of angles, and wherein the bail is coupled by third and fourth rotational coupling mechanisms of the bail to first and second rotational coupling mechanisms of the latch base, the first and second rotational coupling mechanisms of the latch base being disposed on a proximal end of the latch base, the third and fourth rotational coupling mechanisms of the bail and the first and second rotational coupling mechanisms disposed on the proximal end of the latch base providing the proximal end of the latch base with freedom to rotate about a second axis in third and fourth directions through a range of angles, wherein the second axis is eccentric to the first axis.

14. The method of claim 13, wherein rotation of the bail in the first direction moves the bail toward the locked position and wherein rotation of the bail in the second direction moves the bail toward the unlocked position, wherein rotation of the bail in the first direction causes the proximal end of the latch base to be rotated in the third direction, and wherein rotation of the proximal end of the latch base in the third direction causes the boss and boss pocket to be moved closer together.

15. The method of claim 14, wherein rotation of the bail in the second direction causes the proximal end of the latch base to be rotated in the fourth direction, and wherein rotation of the proximal end of the latch base in the fourth direction causes the boss and boss pocket to be moved farther away from each other.

16. The method of claim 9, further comprising:
  providing the latching bail mechanism with a de-latching element having an end portion that extends below a top surface of the bail when the bail is in the locked position, the end portion of the de-latching element being disposed to allow a person or device to de-latch the latching bail mechanism by contacting a bottom surface of the end portion and pulling the end portion in a direction away from the transceiver module housing.

\* \* \* \* \*